Patented Oct. 3, 1950

2,524,431

UNITED STATES PATENT OFFICE 2,524,431

ISOMERIC POLYCHLOROPYRAZINES AND PREPARATION THEREOF

James K. Dixon, Riverside, Conn., Alexander A. Miller, Madison, Wis., and John F. Bruesch, Stamford, Conn., assignors to American Cyanamid Company, New York, N. Y., a corporation of Maine No Drawing. Application May 8, 1948,
Serial No. 25,986

10 Claims. (Cl. 260—250)

This invention relates to polyhalogenopyrazines and to a novel process of preparing these compounds. More particularly, it relates to the direct halogenation of pyrazine at elevated temperatures in the vapor phase to produce polyhalogenopyrazines.

In the present specification the term "pyrazines" is used to include only pyrazine per se, and "halogenopyrazines" derived therefrom. "Halogenopyrazines" is used to designate such "pyrazines," chlorine or bromine substituted on a ring carbon only. Such compounds as the three isomeric dichloro and dibromopyrazines, tribromopyrazine and tetrachloropyrazine are obtained in accordance with the present invention. Many of these are believed to be new compounds. Production of a number of these compounds by halogenating monohalogenopyrazines forms a part of the subject matter of the application of Alexander A. Miller, one of the present inventors, Serial No. 25,987; and the isolation of isomeric dichloropyrazines and dibromopyrazines forms a part of the subject matter of the application of James K. Dixon and Alexander A. Miller, Serial No. 25,985, both applications being filed of even date.

In accordance with the present invention, halogenopyrazines are prepared by direct halogenation of the pyrazines in the vapor phase at from about 300°–600° C. That this may be done, particularly in the vapor phase, is quite surprising in view of the previously available knowledge of pyrazines and halogenated pyrazines. Such information indicated that these compounds could not be so obtained.

It has always been postulated that the pyrazine ring is too unstable for direct halogenation. For example, it is well known that in the solid or liquid state, pyrazine, a six-membered, symmetrical, heterocyclic compound containing two nitrogens para-positioned in the ring, cannot be successfully chlorinated or brominated by direct methods. Solid pyrazine is so rapidly attacked by halogens, to produce carbonaceous decomposition products, that it is impossible to ascertain definitely whether or not any halogenation originally occurs. In similar experiments, wherein a gaseous halogen was passed through liquified pyrazine, or pyrazine in solution, only decomposition products were obtained.

This generalization was later somewhat modified with respect to the vapor phase, but the modification appeared to be specific to monosubstitution. For example, Winnek, U. S. Patent No. 2,396,066, found that in the presence of a suitable copper catalyst and nitrogen, pyrazine could be chlorinated in the vapor phase. However, he further found that instead of the expected mixture of mono- and polychloropyrazines, he obtained only substantially pure monochloropyrazine, the remaining pyrazine apparently being destroyed.

That the modification was specific to monosubstitution appeared to be confirmed by Sayward, U. S. Patent No. 2,391,745, who subsequently found that in the presence of sufficient water vapor that pyrazine could be chlorinated in the vapor phase at about 435° C. without a catalyst. Like Winnek, Sayward also found that apparently only monochloropyrazine was produced in recoverable yields, the remainder of the pyrazine being unreacted or destroyed. Both Sayward and Winnek had present in their work sufficient chlorine to have produced polychloro-substitution. Neither found that it occurred.

Not only monochloropyrazine, monobromopyrazine but a so-called "dibromopyrazine" have been prepared by methods other than direct halogenation. These previously-known processes, being indirect, involve extra steps, are expensive and are not adaptable for development on a commercially-feasible basis. However, polyhalogenopyrazines possess utility in many varied fields, such as in the preparation of insecticides, artificial fibers, detergents and ionic resins. These properties create a marked potential demand, even though this demand cannot be commercially satisfied by production using any previously known process.

It is, therefore, a principal object of the present invention to produce polyhalogenopyrazines, including those previously not known. A further principal object is to produce them, if possible, by a process utilizing direct halogenation, thereby involving fewer steps as well as using readily available and more economical starting materials. Preferably, also, such a process should be operable in the vapor phase in order to obtain the advantages of simplicity, flexibility and ease of control which such processes offer.

It would appear from a study of the above-noted, earlier work that the accomplishment of these objects is impractical if not impossible. Recent publications have so stated. However, the procedure, meeting such requirements, as developed in the present invention, contraverts all such predictions and is not only wholly practical but simple in use and readily controlled.

In general, the objects of the present invention are readily met by direct contact in the vapor phase at elevated temperatures of pyrazine and chlorine or bromine. Preferably, reaction is carried out in the presence of water vapor. In the case of chlorine, the desired result is obtained in the same general temperature range previously found by Sayward to produce only monochloropyrazine. Bromination requires, and proceeds at, a higher temperature range, one including temperature conditions which would have been expected to adversely effect the unstable pyrazine ring.

Superficially then, the present process resembles that of Sayward. However, the resemblance is largely superficial. Successful poly-, rather than mono-, substitution is obtained by carefully preheating the reactants, maintaining the correct total halogen: pyrazine ratio and staying within definite temperature limitations throughout the period of vapor contact. This period is relatively short at the reaction temperature. Subsequently, the condensable vapors in the reacted mixture are condensed and the halogenated product recovered therefrom by distillation.

In outlining the successful operation of the process of the present invention it is substantially impossible to wholly separate a consideration of the effect of the reaction temperature and the halogen:pyrazine ratio. In this discussion, the halogen:pyrazine ratio is taken to be the ratio of the total halogen to pyrazine fed up to any point in the reaction, whether the halogen was substituted or not.

Below a certain reaction temperature level, about 300° C. in the case of chlorine, and about 400° C. in the case of bromine, little or no useful substitution takes place. The yields become much more satisfactory when these temperatures are increased 25° C. or more. The overall yields appear to continue to increase as the reaction temperature approaches about 450° C. in the case of chlorine and about 575° C. for bromine. Temperatures above about 475° C., in the case of chlorine, and above about 600° C. for bromine, are not ordinarily desirable since they promote side reactions at the expense of desirable product. Temperatures above about 500° C. with chlorine and above about 625° C. with bromine are impractical.

The temperature limitations cited are average maximum temperatures of the reaction during the time in which a major portion of the last halogen is substituted. It is, of course, impossible to avoid occasional temporary local overheating. This will not necessarily prove harmful unless continued for sufficient time to raise the average temperature for that reaction zone above the indicated limit and maintain such increase for an extended period.

While it is necessary to heat the reactants to initiate halogen substitution, the latter is exothermic, chlorine in particular being violently so at the outset. After the reaction rate becomes appreciable, therefore, the reaction must be controlled to prevent the temperature exceeding the desirable maximum limits. Two practical methods of obtaining this control were found in the use of diluent vapors and in control of the total halogen:pyrazine ratio at any stage in the reaction. Though not essential, a combination of both is to be preferred.

In selecting a diluent for the reaction, any inert gas or vapor may be used. However, to employ water vapor is preferable. In some manner, not wholly subject to complete explanation, the presence of water vapors appears to have a beneficial effect other than its simple utility as a diluent. Further, the specific heat of the water vapor is such that it absorbs part of the heat of reaction and thus assists in controlling the reaction rate.

Several factors influence the choice of the initial halogen:pyrazine ratio. For example, to insure complete conversion of all the pyrazine to a disubstituted product, two mols of halogen per mol of pyrazine is theoretically required. In actual practice more is found necessary. However, if the initial mol ratio of unreacted halogen:pyrazine exceeds some value between about 1.3:1 and 1.5:1, varying somewhat with other conditions, the reaction rate becomes too rapid, in the case of chlorine being virtually uncontrollable. The total halogen:pyrazine ratio, therefore, should be brought to its final value by stage addition of the halogen.

It is, of course, possible to start with a very small halogen:pyrazine ratio, for example, 0.2:1 or 0.3:1. More halogen in small increments may then be fed as fast as the previously added halogens have substituted. This produces a very effective control. While the process itself is very flexible in this respect, for practical reasons it is desirable that the initial ratio be as high as possible and the number of points of addition be minimized.

It has been found that an initial halogen:pyrazine ratio of 0.5:1 is about the minimum desirable practical limit. An initial ratio of about 1:1 is still more desirable on the basis of practicality. For example, since there is always some reaction other than to the theoretical product, a total halogen:pyrazine ratio of somewhere between about 1.1–1.3 is necessary to insure the substitution of at least one mol of halogen per mol of pyrazine. With a diluent, an initial ratio as high as 1.3:1 or in some few cases even higher, approaching the upper 1.5:1 limit, may be used. This procedure may be preferable. Initial ratios of 1.5:1 and higher should be avoided.

The successful use of initial ratios of from 1:1 up to 1.5:1 also is contrary to expectations based on prior art. In the latter, it was considered that there must always be a pyrazine excess to insure complete utilization of all the halogen. This was to prevent any contact of free halogen and liquid pyrazine in the condensate. Such free halogen would attack the liquid pyrazine and destroy it.

In the present invention, this consideration was found to be relatively unimportant. It was found that after one mol of halogen per mol of pyrazine has substituted, the stability, in the liquid state, of the pyrazine to free halogen is definitely increased. In fact, substitution of a second chlorine in the pyrazine ring appears to be substantially impossible in the liquid phase in spite of the violent decomposition resulting from the inter-reaction of unsubstituted liquid pyrazine and a halogen.

It was also found, in accordance with the present invention, that even in the vapor phase after about one mol of halogen per mol of pyrazine has substituted, the excessive violence of reactivity is decreased. Once this point is reached, the remaining necessary halogen, if necessary, can be fed to the reactants mixture in a single stage. In operation, this point of substitution may be quite readily determined. Once the first mol of halogen per mol of pyrazine has substituted, the temperature of the reactants in the conversion chamber goes up more slowly. A series of temperature readings is taken along the conversion chamber through which the reactants are passing. For otherwise fixed conditions, there is at some point a sharp drop in the rate of temperature rise. Due to heat absorption, there will usually be an actual temperature drop at this point. At this point there will be the halogen:pyrazine ratio necessary to insure substitution of one mol of halogen per mol of pyrazine. The introduction of additional amounts of free halogens into the conversion chamber may be safely accomplished at any point beyond this at any rate permitted by other conditions.

From the foregoing it would appear, then, that control of the temperature may be obtained by control of the amount of diluent and/or the rate of halogen addition to the reaction. The latter may be adjusted and controlled by observation of the temperature. This is an important feature in successful operation of the process to produce poly-substituted products.

In feeding the succeeding amounts of halogen, the ratio of halogen to unreacted pyrazine should not be allowed to go to above 1.5:1 until about 1.3 mols of halogen per mol of pyrazine has substituted in the pyrazine ring even though any ratio greater than about 1:1 yields some dihalogenated product. After about 1.3–1.4 mols of halogen per mol of pyrazine has substituted, the pyrazine-halogen ratio is less critical. Excessively high final ratios should be avoided. For example, in dihalogenation, the use of final ratios higher than about 2.5:1 is wasteful. Such ratios require separation and/or recovery of unused excess halogen and/or produces excessive amounts of higher substituted derivatives. Below this level this problem is not serious.

The halogen should not be admixed with the pyrazine until the latter is fully vaporized because of the tendency for halogens to decompose liquid pyrazine. To insure complete vaporization and prompt initiation of the reaction, the vapors should be preheated. Preferably this should be carried to approximately the initial temperature in the reaction zone before they are admitted thereto. Because the reaction rate of a halogen-pyrazine mixture having a mol ratio below the 1.5 maximum is not appreciable below about 300° C., the vaporized reactants may be safely preheated to this level before or after admixture.

In accordance with this invention, a preheating schedule of preheating both before and after admixing is found of definite advantage. The separate reactants are heated separately in any desired manner up to about 50°–150° C., less than the reaction temperature, 200°–300° C. for chlorine and 300°–400° C. for bromine. They are then mixed and rapidly heated together up to about 25°–50° C. below the initial temperature in the reaction chamber.

Another factor in controlling the temperature rise in the reactor is the contact time. While the contact time is to a considerable degree governed by the selection of the other factors within their preferred range, it is a necessary consideration in determining the feed rate of the materials into the reaction zone. A contact time of about one to five seconds is generally found to be desirable and to represent good average practice. However, as short as about 0.25 to as long as about 50.0 seconds can be used if necessary. Any feed and diluent rates which produce these results are satisfactory. However, an excessively long contact time, especially at the higher permissible temperature, favors side reactions and decomposition, and should be avoided. Too short a contact time allows unconverted pyrazine to enter the condensation system where it may be attacked by halogen.

No special apparatus or catalyst is necessary. In fact, unless water vapor may be considered as having a catalytic effect, no catalyst is necessary. Since the reaction is in the vapor phase, it is highly desirable that all the material be fully vaporized before entering the reaction zone. Any apparatus capable of feeding the reactants at controlled rates to a vaporizer or vaporizers, introducing the vaporized mixture to be reacted into the reaction zone, permitting correct contact time, condensing the condensable product and distilling the latter, may be used. The reactor may be any suitable closed space. It should be large enough to insure the correct contact time. It should not be constructed from a material which may be attacked by the reactants or which may react with halogens to produce salts having a catalytic effect on the pyrazines or halogenopyrazines. We have found materials such as glass, quartz, stainless steel, "Inconel" and the like are satisfactory.

It would appear at first instance that the principal function of the water vapor is to serve as a diluent. That it does serve this function is shown by the fact that to a certain extent it can be replaced by other inert diluents, as for example carbon tetrachloride vapor, carbon dioxide or nitrogen. However, as noted above, water vapor appears to have a definite advantage which may be due to some additional action. For example, in using carbon tetrachloride or nitrogen as diluents to control contact time and/or reaction temperature very appreciable amounts of decomposition products are obtained. These are largely absent when water vapor is used.

When used as a diluent, water vapor is easily introduced. This may be done by means of a separate vaporizer if so desired. It is simpler to vaporize pyrazine in aqueous solution. The amount of water vapor used may be quite widely varied. It has been found that a good average practice producing satisfactory results is to use a molar ratio of water to pyrazine of from about 2:1 up to about 10:1. Practically, a range of from 3:1–6:1 will cover most usage.

While the present invention is limited to bromine and chlorine, some consideration must be given to the differences in the latter, both in functionality and activity. Of the two, chlorine is the more active and requires more careful control of the reaction rate and temperature to insure optimum results. Otherwise the considerations noted above are of general application.

Typical reactions, illustrative of the present invention, are set forth in the following examples. Unless otherwise noted, all parts are by weight.

EXAMPLE 1

A 55% by weight solution of pyrazine in water was continuously fed to a vaporizer, the vapors being preheated to about 300° C. and the preheated vapors fed into a continuous reactor tube at a substantially constant rate. A substantially steady flow of chlorine gas, preheated to about the same temperature was also added so as to obtain a chlorine:pyrazine ratio of about 1.5:1. The preheated materials were fed so as to maintain a contact time of 15 seconds in a reaction zone maintained at a substantially constant temperature of 300° C. Substantially no dichlorination took place.

EXAMPLE 2

Example 1 was repeated, preheating the vapors to about 375° C. and using an average reaction temperature of 400° C. and a contact time of about 20 seconds. The reaction mixture heated spontaneously to about 420° C. and then due to heat transfer through the walls of the reactor, the temperature decreased to the average value of 400° C. At this point additional chlorine was continuously introduced at a rate sufficient to produce a total chlorine-pyrazine ratio of about 2.3:1. The temperature increased some 10° C. due to the heat of reaction. No chlorine was found in exit gases.

The reacted mixture was condensed. The condensed product was neutralized with a 25% solution of caustic soda and then steam distilled. Some chlorinated pyrazine separated as a heavy oil from the distillate. The aqueous phase of the distillate was extracted with three portions of benzene and the benzene extract combined with the bulk of the oil for fractionation. The benzene was removed by atmospheric distillation and the residue was distilled at 50 mm. pressure in a Widmer column. A forerun of unconverted pyrazine was collected. Some monochloropyrazine distilled at 72° C. A good yield of dichloropyrazines distilled at 94°–103° C.

EXAMPLE 3

Example 2 was repeated using an average reaction temperature of 450° C. and a contact time of 5 seconds. The conditions were slightly too drastic. Results were slightly inferior to those of Example 2.

EXAMPLE 4

Example 3 was repeated but the vapors mixture flow was divided about one-half being treated for three seconds at 350° C. and the remainder for three seconds at 450° C. The products, taken at intervals, comprised 30–35% of the pyrazine as monochloropyrazine and 40–45% as dichloropyrazine.

EXAMPLE 5

Liquid bromine was continuously fed to a vaporizer at the uniform rate of feed of 0.017 mol per minute. A 55% solution of pyrazine in water was fed at 0.012 mol of pyrazine per minute to a separate vaporizer. The vaporized mixture of water and pyrazine was preheated to approximately 250° C., then mixed with about half of the bromine vapor at approximately the same temperature and the mixture heated to approximately 400° C. and fed to the converter. The remaining bromine, preheated to about 400° C. was introduced into the converter at about the midpoint in the reaction zone. The total contact time of the vapors in the converter amounted to 2.2 seconds.

The products issuing from the converter were condensed and the products collected. The condensate, consisting essentially of a water solution of unconverted pyrazine, hydrobromic acid and an oil layer made up of bromopyrazines was diluted with water, neutralized with sodium carbonate to a pH of 7–8 and the neutralized solution steam distilled. The steam distillate separated into layers, a water layer containing most of the unconverted pyrazine, and an oil layer consisting principally of the bromopyrazines.

The unconverted pyrazine was determined in the water layer of the steam distillate as its insoluble mercuric chloride salt. The total bromopyrazines formed were obtained from the weight of the oil layer. The oil layer was subsequently distilled in order to determine the amount of mono-, di- and tribromo pyrazines. Runs were repeated at differing temperatures, contact times and halogen/pyrazine ratios. Illustrative results are shown in the following table:

TABLE I

*Vapor phase bromination of pyrazine*

| Run | 1 | 2 | 3 | 4 | 5 | 6 | 7 | 8 |
|---|---|---|---|---|---|---|---|---|
| Converter Temp., °C | 410 | 460 | 515 | 370 | 505 | 480 | 530 | 575 |
| Contact Time, seconds | 2.2 | 2.1 | 2.0 | 2.4 | 1.8 | 6.5 | 1.8 | 4.2 |
| Bromine Rate, mols/min | 0.017 | 0.013 | 0.013 | 0.013 | 0.021 | 0.009 | 0.022 | 0.022 |
| Pyrazine Rate, mols/min | 0.012 | 0.011 | 0.012 | 0.012 | 0.012 | 0.003 | 0.011 | 0.010 |
| Pyrazine Input, mols | 0.54 | 0.74 | 0.52 | 0.61 | 0.54 | 1.39 | 2.66 | 1.74 |
| Pyrazine Recovered, mols | | 0.31 | 0.10 | 0.38 | 0.05 | 0.20 | 0.36 | 0.25 |
| Pyrazine Conversion, Per Cent | | 58 | 79 | 38 | 92 | 86 | 87 | 86 |
| Oil Layer, g | 1–2 | 28 | 48 | 0 | 67 | 120 | 330 | 235 |

*Distillation of oil layers*

YIELDS BASED ON PYRAZINE USED UP

| Run | 1[1] | 2 3 Distilled Together | | 4[2] | 5 | 6 7 Distilled Together | | 8 |
|---|---|---|---|---|---|---|---|---|
| Monobromopyrazine, Per Cent Yield | | 43 | | | 36 | 23 | | 7 |
| Dibromopyrazine, Per Cent Yield | | 12 | | | 27 | 35 | | 38 |
| Tribromopyrazine, Per Cent Yield | | 0.5 | | | 1.3 | 1.2 | | 17 |

[1] Low yield } too low reaction temperature.
[2] No yield

Identification of bromopyrazines

The products from Runs 6 and 7 were combined for distillation. Three main fractions were obtained: (1) 118 g. liq. B. P. 61–64° C. at 9–10 mm., $N_D^{25}$ 1.575–1.578, this was shown to be monobromopyrazine; (2) 287 g. liq.+solid, B. P. 86–89° C. at 4–5 mm., this was shown to be a mixture of the three isomeric dibromopyrazines; (3) a residue of 24 g. which was distilled, B. P. 87–88° C. at 1 mm., this was shown to be composed of tribromopyrazine 80% and dibromopyrazine 20%. Identification of the three isomeric dibromopyrazines and tribromopyrazine was based on microchemical nitrogen analyses, infra-red spectra, and dipole moment measurements. Tribromopyrazine, 95% pure by infrared analysis, melted at 40°–44° C.

TABLE II

*Comparison of Dichloro and Dibromopyrazines*

| Isomer | Dibromo-Source | M. P., °C. | Dichloro-Source | M. P., °C. |
|---|---|---|---|---|
| 2,6 | Solid obtained from first dibromopyrazine fraction. | 49–52 | Solid obtained from first dichloropyrazine fractions. | 53–54 |
| 2,5 | Obtained by freezing out isomer from intermediate fractions. | 6.5–8 | Obtained by freezing out isomer from intermediate fractions. | 0 |
| 2,3 | Solid obtained from last fractions | 59–61 | Solid obtained from last fractions | 23–24 |
|  | Residue—tribromopyrazine |  | Residue—tetrachloropyrazine |  |

Data are in agreement between dibromo- and dichloropyrazines except that order of melting points for the 2,3 and 2,6 isomers are reversed. Also, tribromopyrazine was found in place of tetrachloropyrazine.

We claim:

1. A process for the preparation of dihalogenopyrazines comprising the steps of subjecting a preheated mixture of vaporized pyrazine and a halogen, selected from chlorine and bromine, to temperatures of from 325°–625° C., whereby the pyrazine is substituted by the halogen, the process being further characterized by using an initial halogen:pyrazine mol ratio in the range above 0.5:1 but below 1.5:1; maintaining the halogen:pyrazine ratio during reaction at not more than 1.5:1 until about 1.3–1.4 mols of halogen per mol of pyrazine has substituted; increasing the total-halogen:pyrazine ratio to at least 2:1; maintaining the reaction temperature for a sufficient time to convert a major portion of the pyrazine to dihalogenated pyrazines; condensing the condensable portion of the reacted vapors, and isolating the dihalogenated pyrazines from the condensate.

2. A process according to claim 1 in which the halogen:pyrazine ratio is maintained at not more than 1.5:1 until a drop in the exothermic generation of heat occurs, sufficient additional halogen to produce a halogen:pyrazine ratio of from 2.0:1 to 2.5:1 is added and the mixture is heated to maintain reaction temperature for a total reaction time from 0.25, at the higher reaction temperatures, to 50 seconds at the lower reaction temperatures.

3. A process according to claim 1 in which the reaction is carried out in the presence of from about 2–10 mols of water vapor per mol of pyrazine.

4. A process according to claim 1 in which the halogen is chlorine and the reaction temperature is maintained at from about 325°–500° C.

5. A process according to claim 1 in which the halogen is bromine and the reaction temperature is maintained at from about 425°–625° C.

6. A process according to claim 1 in which the pyrazine and halogen are separately heated to 50°–150° C. less than the initial reactor temperature, admixed and the mixture heated to about 25°–50° C. less than that temperature.

7. A process according to claim 6 in which 3–6 mols of water per mol of pyrazine is used, the halogen pyrazine and water vapor being preheated to 25°–50° C. less than the initial reactor temperature before being introduced into the reactor.

8. A process according to claim 6 in which the halogen is chlorine and the reaction temperature is maintained at from about 325°–500° C., the time of contact being from not more than 50 seconds at the lower temperature to not more than about 1 second at the higher temperature.

9. A process according to claim 6 in which the halogen is bromine and the reaction temperature is maintained at from about 425°–625° C., the time of contact being from not more than 50 seconds at the lower temperature to not more than about 1 second at the higher temperature.

10. Tribromopyrazine.

JAMES K. DIXON.
ALEXANDER A. MILLER.
JOHN F. BRUESCH.

REFERENCES CITED

The following references are of record in the file of this patent:

UNITED STATES PATENTS

| Number | Name | Date |
|---|---|---|
| 2,391,745 | Sayward | Dec. 25, 1945 |

Certificate of Correction

Patent No. 2,524,431                                                            October 3, 1950

JAMES K. DIXON ET AL.

It is hereby certified that error appears in the printed specification of the above numbered patent requiring correction as follows:

Column 2, line 13, for "435° C." read *425° C.*; line 16, strike out "was"; column 3, line 18, after "halogen" and before "pyrazine" strike out the semicolon and insert instead a colon; line 24, for "product" read *produce*; column 8, Table I, ninth column thereof, for "4.2" read *2.4*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*